(12) United States Patent
Yoshida et al.

(10) Patent No.: US 10,195,773 B2
(45) Date of Patent: Feb. 5, 2019

(54) METHOD AND APPARATUS FOR MANUFACTURING OPTICAL COMPONENT, AND OPTICAL COMPONENT

(71) Applicant: Koito Manufacturing Co., Ltd., Tokyo (JP)

(72) Inventors: Kenji Yoshida, Shizuoka (JP); Takahito Osawa, Shizuoka (JP); Masashi Katayama, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 77 days.

(21) Appl. No.: 14/753,830

(22) Filed: Jun. 29, 2015

(65) Prior Publication Data

US 2016/0004002 A1 Jan. 7, 2016

(30) Foreign Application Priority Data

Jul. 3, 2014 (JP) ................................ 2014-138081

(51) Int. Cl.
*B29C 45/40* (2006.01)
*B29D 11/00* (2006.01)
(Continued)

(52) U.S. Cl.
CPC ........ *B29C 45/401* (2013.01); *B29D 11/0048* (2013.01); *B29D 11/00663* (2013.01);
(Continued)

(58) Field of Classification Search
CPC .................................................. B29C 45/401
See application file for complete search history.

(56) References Cited

U.S. PATENT DOCUMENTS 4,889,311 A * 12/1989 Anglin ............... B22D 17/2236
164/347
6,179,599 B1 * 1/2001 Venrooij ............. B29C 45/4005
425/116
(Continued)

FOREIGN PATENT DOCUMENTS

JP   50-140973 U   11/1975
JP   59-153112 U   10/1984
(Continued)

OTHER PUBLICATIONS

An Office Action dated Jan. 26, 2017, issued from the Chinese State Intellectual Property Office of the P.R.C (SIPO) of Chinese Patent Application No. 201510378341.7 and an EN translation thereof.

*Primary Examiner* — Ryan M Ochylski
(74) *Attorney, Agent, or Firm* — Abelman, Frayne & Schwab (57) ABSTRACT

A method for manufacturing an optical component having an optical surface includes: injecting a molten resin into a cavity; curing the molten resin to form the optical component; and taking the optical component out from the movable mold by moving the movable mold away from the fixed mold, and piercing a part of the optical surface (first incident surface) of the optical component attached to the movable mold by the protruding pin, and then wherein a tip end face of the protruding pin includes: a first surface; and a second surface having an area smaller than an area of the first surface, and extending continuously from the first surface in a curved form, the second surface being located on at least a part of an outer circumferential edge portion of the tip end face, that is, a tip end in the first direction.

5 Claims, 6 Drawing Sheets

(51) Int. Cl.
  *F21S 43/19*    (2018.01)
  *F21S 43/14*    (2018.01)
  *F21S 43/235*   (2018.01)
  *F21S 43/249*   (2018.01)
  *F21S 43/31*    (2018.01)
  *B29C 45/37*    (2006.01)
  *B29L 11/00*    (2006.01)

(52) U.S. Cl.
  CPC ............... *F21S 43/14* (2018.01); *F21S 43/19* (2018.01); *F21S 43/235* (2018.01); *F21S 43/249* (2018.01); *F21S 43/315* (2018.01); *B29C 45/37* (2013.01); *B29C 2045/4063* (2013.01); *B29L 2011/00* (2013.01)

(56) References Cited

U.S. PATENT DOCUMENTS

| | | | | |
|---|---|---|---|---|
| 6,435,855 | B1* | 8/2002 | Sakurai | B29C 45/40 264/334 |
| 2003/0086276 | A1* | 5/2003 | Ohtsuka | B60Q 1/2607 362/511 |
| 2003/0132495 | A1* | 7/2003 | Mills | B29C 45/401 257/433 |

FOREIGN PATENT DOCUMENTS

| | | |
|---|---|---|
| JP | 2002-200654 A | 7/2002 |
| JP | 2003-141909 A | 5/2003 |
| JP | 2010-058461 A | 3/2010 |
| JP | 2010-247539 A | 11/2010 |

\* cited by examiner

METHOD AND APPARATUS FOR MANUFACTURING OPTICAL COMPONENT, AND OPTICAL COMPONENT

CROSS-REFERENCE TO RELATED APPLICATIONS

This application is based on and claims priority from Japanese Patent Application No. 2014-138081, filed on Jul. 3, 2014, with the Japan Patent Office, the disclosure of which is incorporated herein in its entirety by reference.

TECHNICAL FIELD

The present disclosure relates to a method and apparatus for manufacturing an optical component, and the optical component.

BACKGROUND

For example, a vehicle lamp, which uses an optical component of a complicated shape such as, for example, a light guide plate, is known (see, e.g., Japanese Patent Laid-Open Publication No. 2003-141909).

SUMMARY

When an optical component having such a complicated shape is resin-molded, an optical surface may be sometimes pierced by a protruding pin to take the optical component out from a mold. In this case, depending on the shape of the optical surface, a tip end of the protruding pin may be bent or broken, thus making it difficult to obtain an optical surface having a desired shape.

Accordingly, an object of the present disclosure is to provide a method and apparatus for manufacturing an optical component, which are capable of easily obtaining an optical surface of a desired shape even if the optical surface is pierced by a protruding pin, and the optical component.

A method for manufacturing an optical component having an optical surface, according to the present disclosure, includes: defining a cavity by making a fixed mold and a movable mold come into contact with each other, the movable mold having a protruding pin that reciprocates in a first direction and configured to reciprocate in the first direction; injecting a molten resin into the cavity; curing the molten resin in the cavity to form the optical component; and taking the optical component out from the movable mold by moving the movable mold away from the fixed mold in the first direction, and piercing a part of the optical surface of the optical component attached to the movable mold by the protruding pin, wherein a tip end face of the protruding pin includes: a first surface; and a second surface having an area smaller than an area of the first surface, and extending continuously from the first surface in a curved form, the second surface being located on at least a part of an outer circumferential edge portion of the tip end face, that is, a tip end in the first direction, wherein an angle of the second surface relative to the first direction is larger than an angle of a portion of the first surface adjacent to the second surface relative to the first direction.

In the method of manufacturing the optical component configured as described above, since the angle of the second surface relative to the first direction is larger than the angle of a portion of the first surface adjacent to the second surface relative to the first direction, it is easy to form a tip end of a tip end face formed on the second surface of the protruding pin into a blunt shape, and an increase in strength may be achieved. Therefore, there is a low possibility that a tip end of an outer circumferential edge of the tip end face formed on the second surface of the protruding pin is bent or broken, so that it is easy to obtain an optical surface of a desired shape.

In the method of manufacturing the optical component according to the present disclosure, the angle of the second surface relative to the first direction may be 60 degrees or more. The method of manufacturing the optical component configured as described above allows the tip end of the outer circumferential edge of the tip end face formed on the second surface of the protruding pin to have a high strength and a blunt shape, thus reliably preventing a damage resulting from the protrusion.

In the method of manufacturing the optical component of the present disclosure, the first surface may be a concave curved surface, and the second surface may be provided on at least a part of a peripheral edge of the first surface. The method of manufacturing the optical component configured as described above allows the optical component likely to be attached to a movable mold to be reliably pushed out by the protruding pin, and thereby enables the optical component to be reliably taken out from the mold.

An apparatus for manufacturing an optical component, according to the present disclosure, includes: a fixed mold; and a movable mold defining a cavity in conjunction with the fixed mold, and reciprocating in a first direction, the movable mold having a protruding pin that reciprocates in the first direction, wherein a tip end face of the protruding pin includes: a first surface; and a second surface having an area smaller than an area of the first surface, and extending continuously from the first surface in a curved form, the second surface being located on at least a part of an outer circumferential edge portion of the tip end face, that is, a tip end in the first direction, wherein an angle of the second surface relative to the first direction is larger than an angle of a portion of the first surface adjacent to the second surface relative to the first direction.

In the apparatus of manufacturing the optical component configured as described above, since the angle of the second surface relative to the first direction is larger than the angle of the portion of the first surface adjacent to the second surface relative to the first direction, it is easy to form the tip end of the tip end face formed on the second surface of the protruding pin into a blunt shape, and an increase in strength may be achieved. Therefore, there is a low possibility that the tip end of the outer circumferential edge of the tip end face formed on the second surface of the protruding pin is bent or broken, so that it is easy to obtain the optical surface of the desired shape.

The optical component of the present disclosure is manufactured by the method of manufacturing the optical component, and has an optical surface, and a step portion provided on at least a part of a peripheral edge portion of the optical surface, the step portion coming into contact with the tip end face of the protruding pin.

The optical component configured as described above makes it easy to stably obtain the optical surface of the desired shape while preventing the damage to the protruding pin in the manufacturing.

The present disclosure may provide the method and apparatus for manufacturing the optical component, and the optical component, which are intended to make it easy to obtain the optical surface of the desired shape even if the optical surface is pierced by the protruding pin.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 5A and 5B are views illustrating the shape of a tip end portion of a protruding pin, in which

FIGS. 6A and 6B are views illustrating the shape of a tip end portion of a protruding pin according to a reference example, in which

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, exemplary embodiments of a method and apparatus for manufacturing an optical component, and the optical component according to the present disclosure will be described with reference to drawings.

(Optical Component)

First, an optical component 30 according to an exemplary embodiment will be described.

Figure 1:
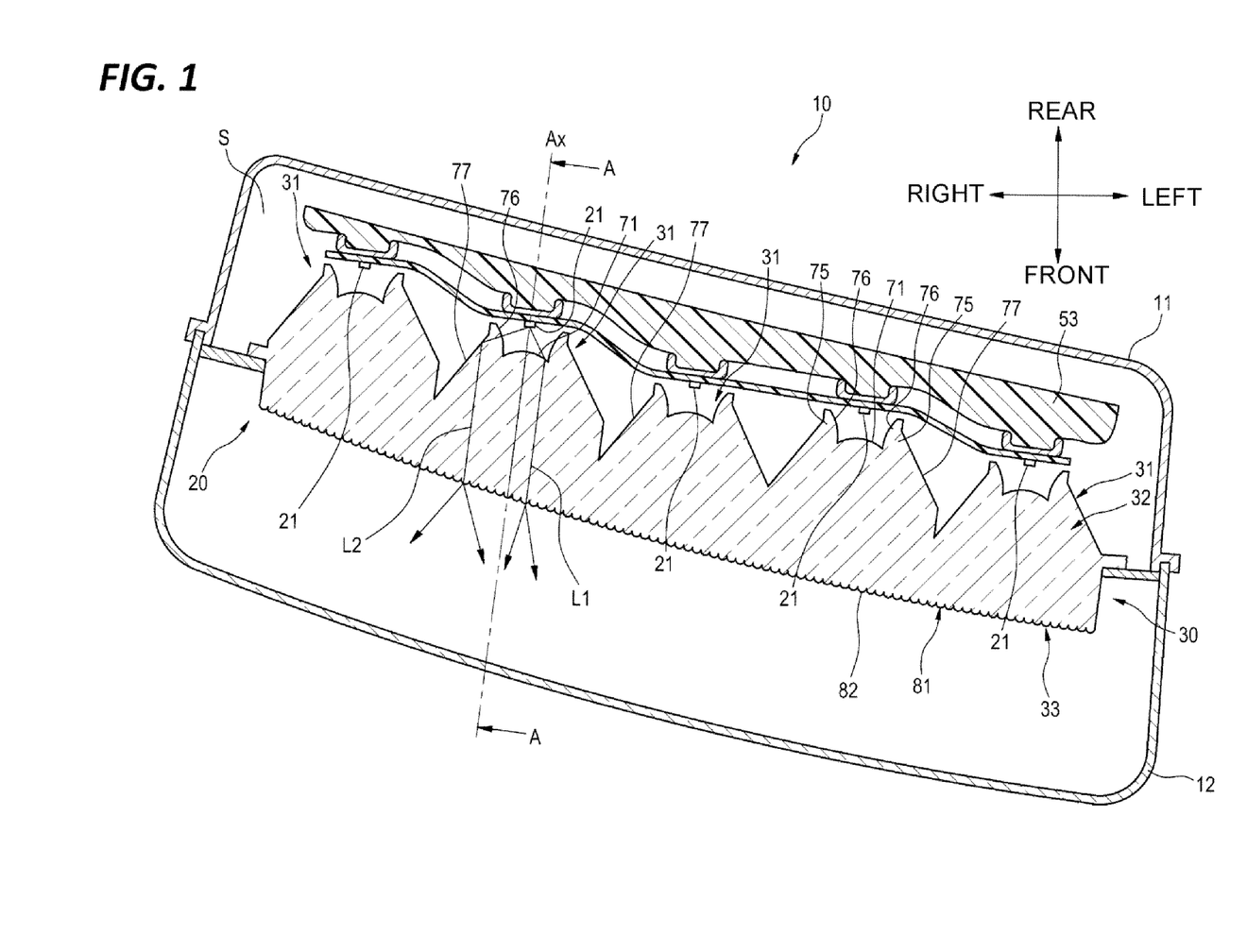
FIG. 1 is a horizontal sectional view illustrating a vehicle lamp equipped with an optical component according to an exemplary embodiment of the present disclosure.
Figure 2:
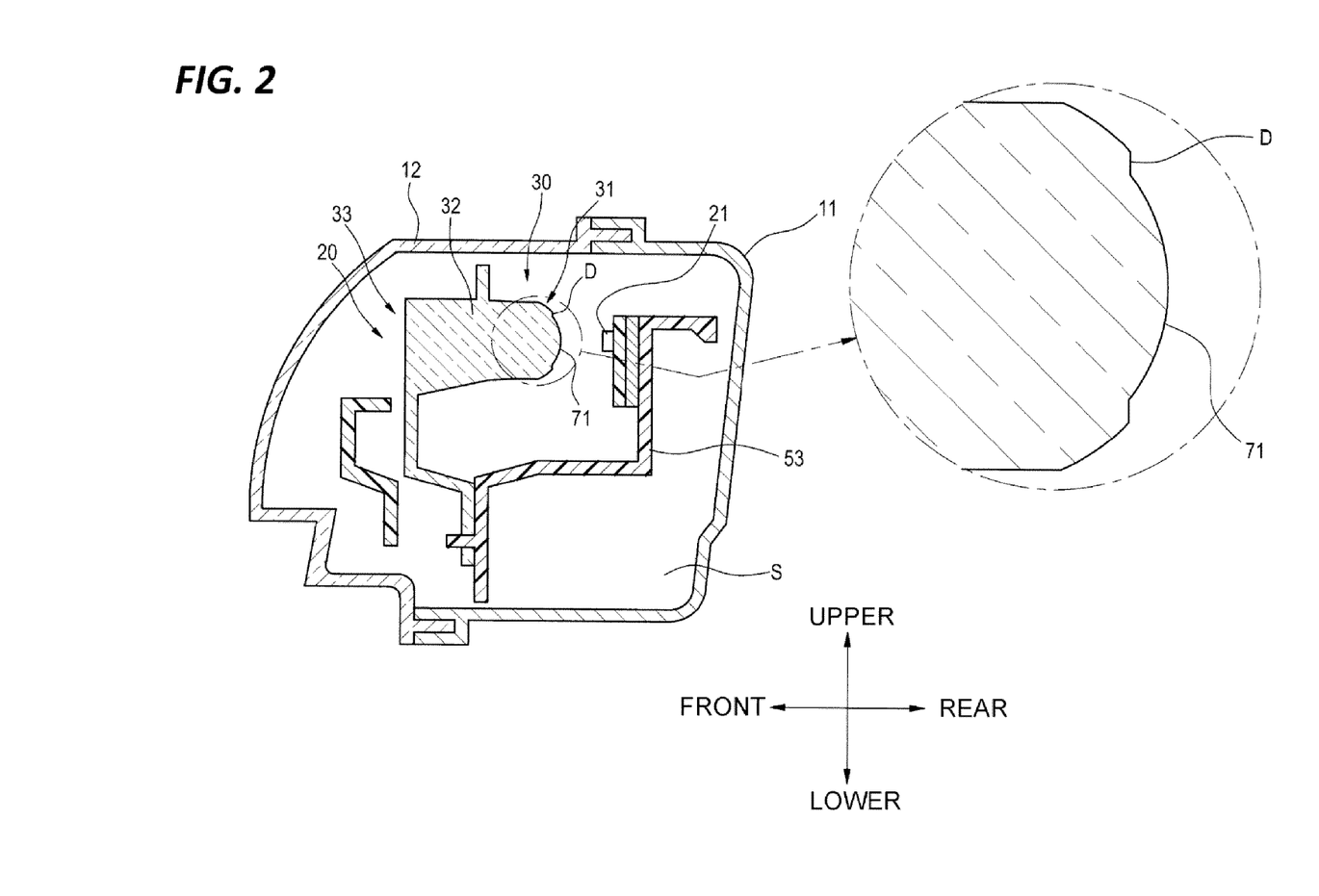
FIG. 2 is a sectional view taken along line A-A of FIG. 1.

FIG. 1 is a horizontal sectional view illustrating a vehicle lamp 10 equipped with an optical component 30 according to an exemplary embodiment, and FIG. 2 is a sectional view taken along line A-A of FIG. 1.

As illustrated in FIGS. 1 and 2, the optical component 30 according to the exemplary embodiment is used in the vehicle lamp 10, as a light guide body. The vehicle lamp 10 is provided with a lamp body 11 made of a resin material and opened at a front side (left side of FIG. 2) of the lamp, and a transparent and resinous outer cover 12 that is attached to an opening of the lamp body 11. The outer cover 12 is disposed to close the opening of the lamp body 11 from the front side, with a lamp chamber S being defined between the outer cover 12 and the lamp body 11.

The vehicle lamp 10 illustrated in the drawings is mounted on a right side of a front portion of the vehicle, as, for example, a daytime running lamp (DRL) for the vehicle. The vehicle lamp 10 has a lamp unit 20 in the lamp chamber S. The lamp unit 20 includes a plurality of semiconductor light emitting elements 21, and the optical component 30 according to the exemplary embodiment.

The optical component 30 is formed through injecting molding of a resin having translucency. This optical component 30 has an incident portion 31 on which light emitted from the semiconductor light emitting elements 21 is incident, a light guide portion 32 which guides light incident on the incident portion 31, and an emitting portion 33 which emits light guided by the light guide portion 32. The optical component 30 is supported by a frame 53 provided in the lamp chamber S.

The optical component 30 is formed in the shape of a plate extending in a left-right direction. This optical component 30 has a plurality of (five in this example) incident portions 31, light guide portions 32, and emitting portions 33, provided in the left-right direction. The semiconductor light emitting elements 21 are arranged at positions facing the incident portions 31, respectively.

Each of the incident portions 31 of the optical component 30 includes a first incident surface 71, and light-guide protrusions 75 each of which has a second incident surface 76. The first incident surface 71 has a convex curved surface that protrudes towards the semiconductor light emitting element 21, for example, a parabolic curve when viewed from a horizontal section. The first incident surface 71 refracts light, which is incident from the semiconductor light emitting element 21, to form parallel light which is substantially parallel to an emission axis Ax.

The light-guide protrusions 75 are formed, respectively, at both sides of the first incident surface 71 in the left-right direction. The light-guide protrusions 75 protrude from the optical component 30 towards the semiconductor light emitting element 21. The second incident surfaces 76 are provided on both inner surfaces of the light-guide protrusions 75 protruding from both sides of the first incident surface 71 towards the semiconductor light emitting element 21, with reflective surfaces 77 being provided on both outer surfaces of the light-guide protrusions 75.

The emitting portions 33 emit light from the semiconductor light emitting elements 21 through the light guide portions 32. These emitting portions 33 are integrally provided to be continuous in the left-right direction. Accordingly, a front surface of the optical component 30 is composed of a band-shaped continuous emitting surface 81 extending in the left-right direction along the shape of the outer cover 12. A plurality of steps 82, each having a cylindrical surface in a minute curved convex shape along a vertical direction, are arranged on the emitting portion 33. Further, the steps 82 may not be provided on the emitting portion 33.

In the optical component 30, light emitted from the semiconductor light emitting elements 21 is incident on the first and second incident surfaces 71 and 76.

Light L1 incident on the first incident surfaces 71 is refracted from the first incident surfaces 71 to be almost parallel to the emission axis Ax of the semiconductor light emitting elements 21. The light L1 refracted from the first incident surfaces 71 is guided as parallel light substantially parallel to the emission axis Ax within the light guide portions 32, and is emitted from the emitting portion 33 to the front side of the lamp while being diffused in the left-right direction by the steps 82.

Light L2 incident on the second incident surfaces 76 is internally reflected from the reflective surfaces 77 to be almost parallel to the emission axis Ax. The light L2 reflected from the reflective surfaces 77 is guided as parallel light which is substantially parallel to the emission axis Ax within the light guide portion 32, and is emitted from the emitting portion 33 to the front side of the lamp while being diffused by the steps 82.

(Apparatus for Manufacturing Optical Component)

Next, an apparatus 100 for manufacturing the optical component 30 will be described.

Figure 3:
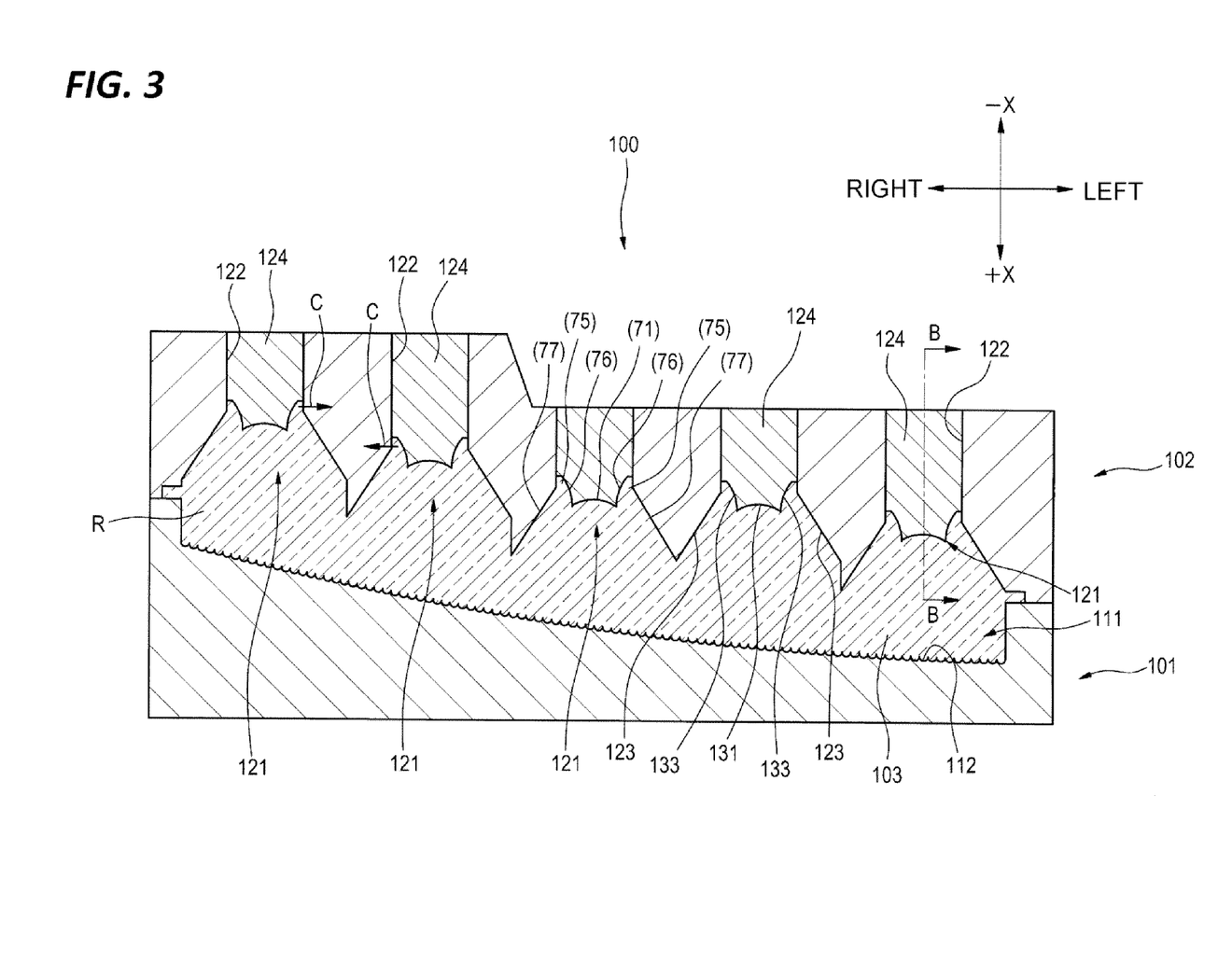
FIG. 3 is a horizontal sectional view illustrating a fixed mold and a movable mold, in which a molten resin is filled in a cavity defined between the fixed mold and the movable mold which are in contact with each other.

FIG. 3 is a sectional view illustrating a fixed mold 101 and a movable mold 102, in which a molten resin R is filled in a cavity 103 defined by the contact between the fixed mold and the movable mold. Further, in the drawing illustrated in FIG. 3, the cross-section of the optical component 30 of FIG. 1 corresponds to the cross-section of the optical component 30 manufactured by the manufacturing apparatus 100 of FIG. 3.

As illustrated in FIG. 3, the apparatus 100 for manufacturing the optical component 30 according to the exemplary embodiment has the fixed mold 101, and the movable mold 102. The movable mold 102 defines the cavity 103 into which the resin R is injected, together with the fixed mold 101. The movable mold 102 is configured to reciprocate in a first direction X relative to the fixed mold 101. By moving in the first direction X, the movable mold 102 comes in contact with or separates from the fixed mold 101. Further, the movable mold 102 has a protruding pin 124 capable of reciprocating in the first direction X relative to the movable mold 102. Further, in FIG. 3, +X denotes a forward-moving direction in the first direction X, and −X denotes a rearward-moving direction in the first direction X.

The fixed mold 101 has an emitting-portion molding concave portion 111 to mold the emitting portion 33 of the optical component 30. A bottom surface of the emitting-portion molding concave portion 111 is formed as an emitting-portion molding surface 112 for molding the emitting portion 33 of the optical component 30.

The movable mold 102 has a plurality of incident-portion molding concave portions 121 to mold the respective incident portions 31 of the optical component 30.

A sliding hole 122 is formed at a central portion in the left-right direction of each of the incident-portion molding concave portions 121 to extend in the first direction X. The protruding pin 124 is provided in the sliding hole 122 to be capable of reciprocating in the first direction X. A tip end face of the protruding pin 124 may be exposed to the cavity 103.

The incident-portion molding concave portion 121 includes a first surface 131, second-incident-surface molding surfaces 133 provided on both outer sides of the first surface 131 in the left-right direction, and reflective-surface molding surfaces 123 provided on both outer sides of the second-incident surface molding surfaces 133 in the left-right direction. The first surface 131 and the second-incident-surface molding surface 133 are provided on the tip end face of the protruding pin 124 exposed to the cavity 103. The reflective-surface molding surfaces 123 are provided around an opening of the sliding hole 122 of the movable mold 102.

The first surface 131 is a concave surface, and a main portion of the first incident surface 71 that is a convex surface of the optical component 30 is molded by the first surface 131. By the second-incident-surface molding surfaces 133, the second incident surfaces 76 of the optical component 30 are molded. By the reflective-surface molding surfaces 123, the reflective surfaces 77 of the optical component 30 are molded. By the second-incident-surface molding surfaces 133 and the reflective-surface molding surfaces 123, the light-guide protrusions 75 of the optical component 30 are molded.

Next, the tip end face of the protruding pin 124 will be described in detail.

Figure 4:
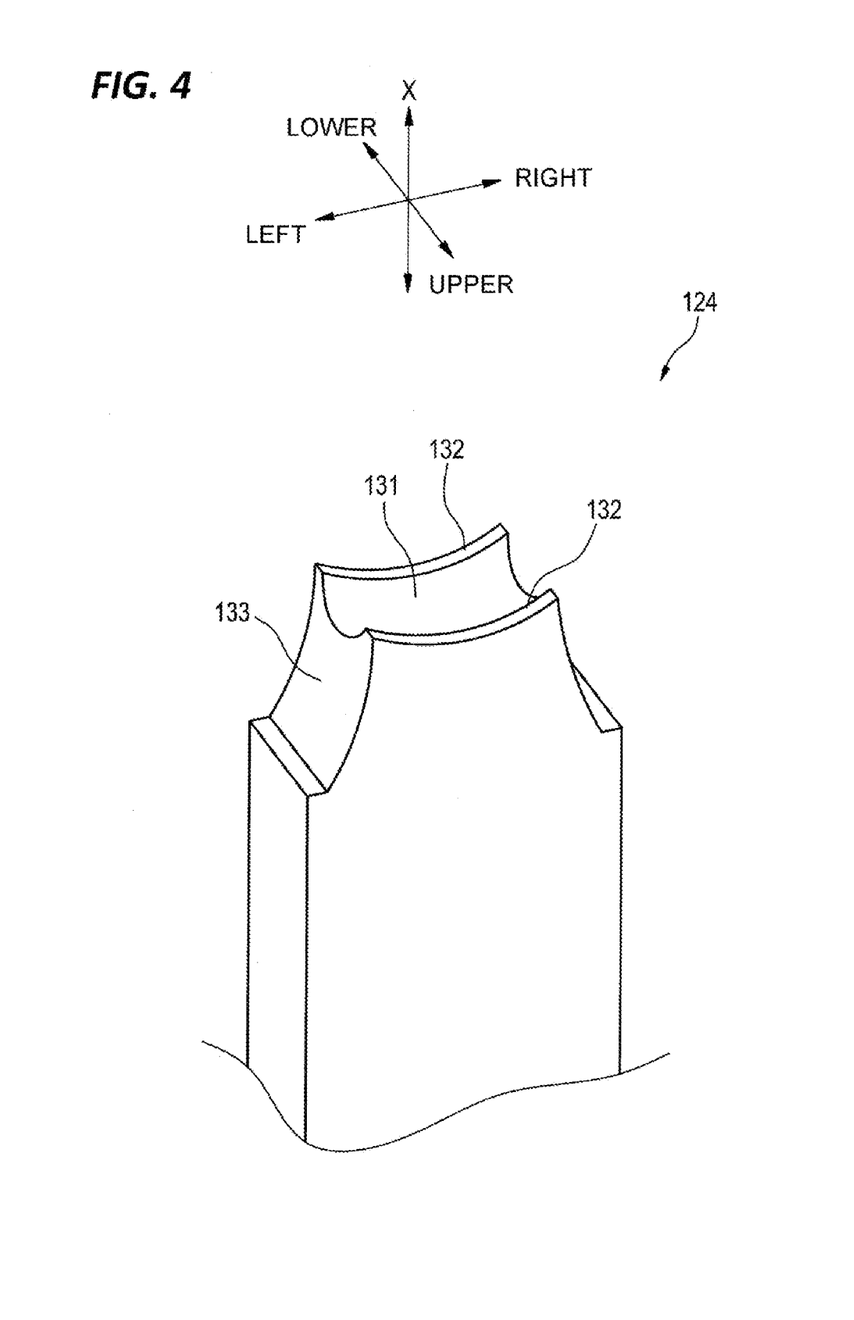
FIG. 4 is a perspective view illustrating a protruding pin.

FIG. 4 is a perspective view illustrating the protruding pin 124. As illustrated in FIG. 4, the protruding pin 124 is formed to have a rectangular cross-section. The tip end face of the protruding pin 124 is composed of a first surface 131 and a second surface 132.

As described above, the first surface 131 is a surface that molds the first incident surface 71 of the optical component 30, and is a concave curved surface.

The second surface 132 has an area smaller than that of the first surface 131, and extends continuously from the first surface 131 in a curved form. The second surface 132 is provided on a part of a peripheral edge of the first surface 131. The second surface 132 is located to be nearer to a tip end, compared to the first surface 131, in the first direction X. The second surface 132 is provided on a part of the outer circumferential edge portion of the tip end face of the protruding pin 124. In the illustrated example, the second surface 132 is provided on each of upper and lower edges of the first surface 131, and has a thin and long rectangular shape in the left-right direction. Further, a state where the first and second surfaces 131 and 132 are continuous to each other in the curved form also includes a case where the first and second surfaces 131 and 132 with different inclinations are gently continuous to each other.

Figure 5A:
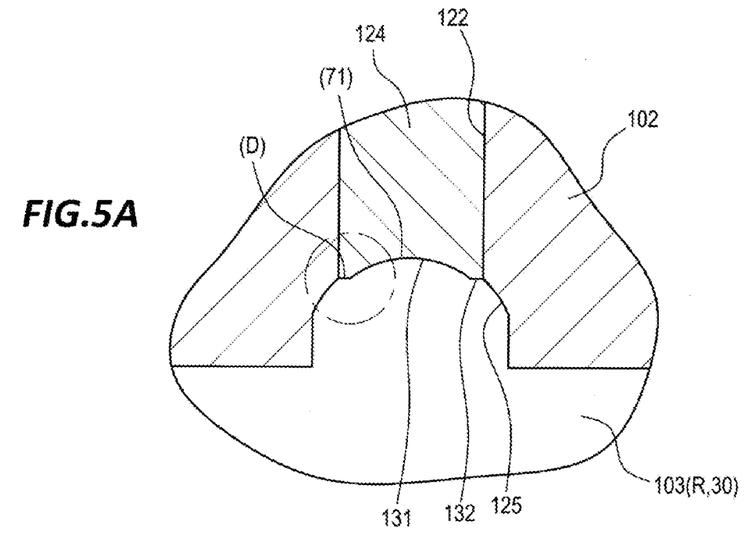
FIG. 5A is a sectional view taken along line B-B of FIG. 3.
Figure 5B:
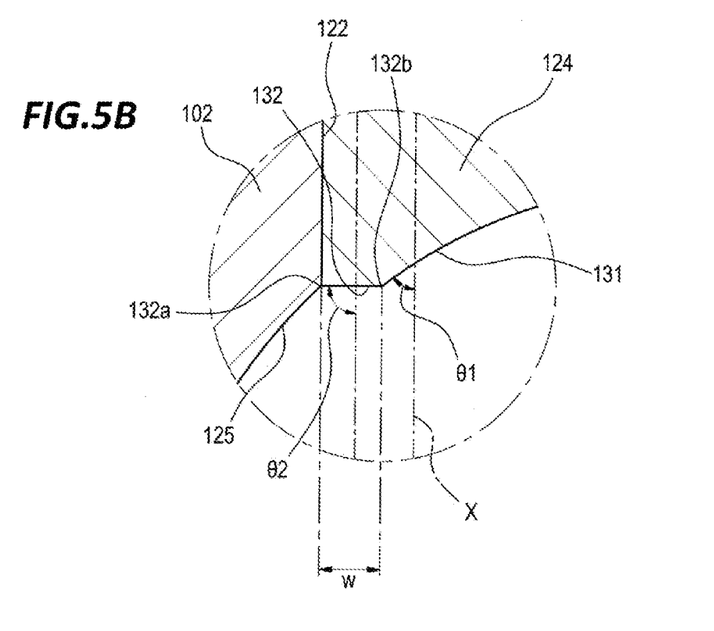
FIG. 5B is an enlarged view illustrating a part of FIG. 5A.

FIGS. 5A and 5B are views illustrating the shape of a tip end portion of the protruding pin 124, in which FIG. 5A is a sectional view taken along line B-B of FIG. 3, and FIG. 5B is an enlarged view illustrating a portion encircled by a one-dot chain line in FIG. 5A.

As illustrated in FIG. 5A, when the resin R is injected into the cavity 103, the protruding pin 124 is set at a position where the outer circumferential edge of the second surface 132 is continuous to an inner surface 125 around the sliding hole 122 of the movable mold 102.

As illustrated in FIG. 5B, if an angle of a portion of the first surface 131 adjacent to the second surface 132 relative to the first direction X at the cavity 103 side is defined as $\theta 1$ and an angle of the second surface 132 relative to the first direction X at the cavity 103 side is defined as $\theta 2$, a relationship of $\theta 1 < \theta 2$ is satisfied between $\theta 1$ and $\theta 2$. That is, an incident-portion molding portion 130 of the protruding pin 124 is configured such that the angle $\theta 2$ of the second surface 132 relative to the first direction X is larger than the angle $\theta 1$ of the portion of the first surface 131 adjacent to the second surface 132 relative to the first direction X. Further, the angle $\theta 1$ of the first surface 131 relative to the first direction X and the angle $\theta 2$ of the second surface 132 relative to the first direction X are compared with each other using small angles thereof.

The angle $\theta 2$ of the second surface 132 relative to the first direction X is set to be 60 degrees or more. The angle $\theta 2$ of the second surface 132 relative to the first direction X is preferably close to 90 degrees. Further, the second surface 132 is a flat surface, and a width W between the outer circumferential edge 132a of the second surface 132 and a border 132b of the second surface 132 adjacent to the first surface 131 is in a range of 0.1 mm to 0.5 mm.

(Method for Manufacturing Optical Component)

Next, the manufacturing method for molding the optical component 30 will be described using the manufacturing apparatus 100 including the fixed mold 101 and the movable mold 102.

<Mold Setting Process>

First, as illustrated in FIG. 3, the movable mold 102 is moved towards the fixed mold 101 in the first direction X, and the fixed and movable molds 101 and 102 come into contact with each other to define the cavity 103. At this time, as illustrated in FIG. 5A, the protruding pin 124 is set at a position where the outer circumferential edge of the second surface 132 is continuous to the inner surface 125 around the sliding hole 122 of the movable mold 102.

<Injection Process>

In this state, the molten resin R produced by melting a transparent resin that is a material for molding the optical component 30 is injected from a gate (not illustrated) into the cavity 103.

<Forming Process>

Further, the optical component 30 is formed by curing the molten resin R in the cavity 103.

<Mold Release Process>

After the resin R is cured, the movable mold 102 is moved away from the fixed mold 101 in the first direction X, thus separating the fixed mold 101 and the movable mold 102 from each other.

At this time, the molded optical component 30 is attached to the movable mold 102 side. The reason is as follows: because the movable mold 102 has the incident-portion molding concave portions 121 of the complicated shape, the optical component 30 may be attached to the movable mold 102 if thermal contraction (arrow C of FIG. 3) occurs when the molten resin R injected into the cavity 103 is cooled and cured.

Specifically, when the optical component 30 that is long in the left-right direction is contracted in the left-right direction, as illustrated in FIG. 3, an interval between the light-guide protrusions 75 of the optical component 30 is reduced and a portion of the movable mold 102 protruding to the cavity 103 may be sandwiched between the light-guide protrusions 75 and thus the optical component 30 may be attached to the movable mold 102.

Therefore, the protruding pin 124 is moved towards the cavity 103 in the first direction X relative to the movable mold 102, and the tip end face thereof pierces a part of the first incident surface 71 that is the optical surface of the optical component 30 to take the optical component 30 out from the movable mold 102.

As illustrated in FIG. 5A, the optical component 30 molded by the above-described manufacturing method has the first incident surface 71 that is the optical surface, and has a step portion D which is provided on at least a part of the peripheral edge portion of the first incident surface 71 that is the optical surface. The step portion D comes in contact with the tip end face of the protruding pin 124, and has a width of 0.1 mm to 0.5 mm. Accordingly, as illustrated in the enlarged view of FIG. 2, the optical component 30 having the step portion D provided on the first incident surface 71 may be obtained. In FIG. 2, the size of the step portion D is exaggerated to emphasize the step portion D.

By the method for manufacturing the optical component 30 according to the exemplary embodiment, the second surface 132 of the protruding pin 124 has the tip end portion formed in a blunt shape. Therefore, the tip end portion of the protruding pin 124 is high in strength, and there is a low possibility that the tip end of the outer circumferential edge of the tip end face formed on the second surface 132 is bent or broken when the protruding pin 124 protrudes, so that it is easy to stably obtain an optical surface of a desired shape.

Effects of the manufacturing method according to the exemplary embodiment will be described in detail by comparison with a protruding pin according to a reference example.

Figure 6A:
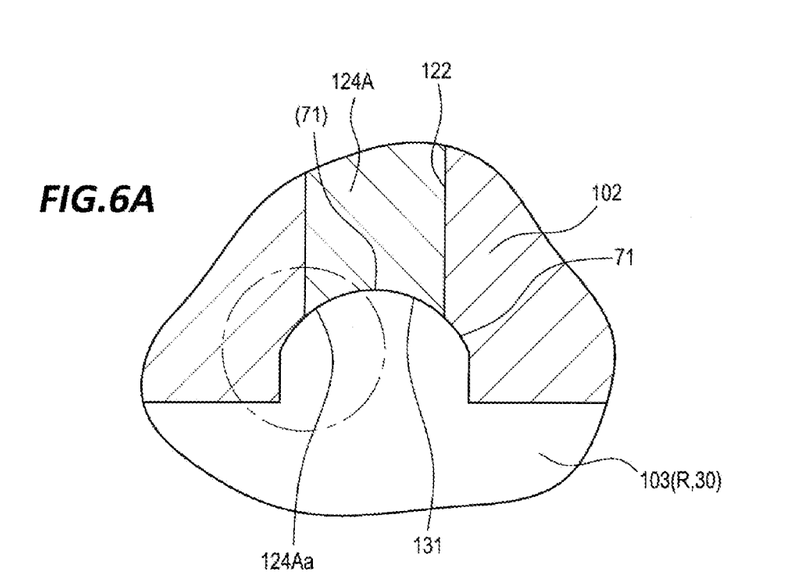
FIG. 6A is a sectional view taken along line B-B of FIG. 3.
Figure 6B:
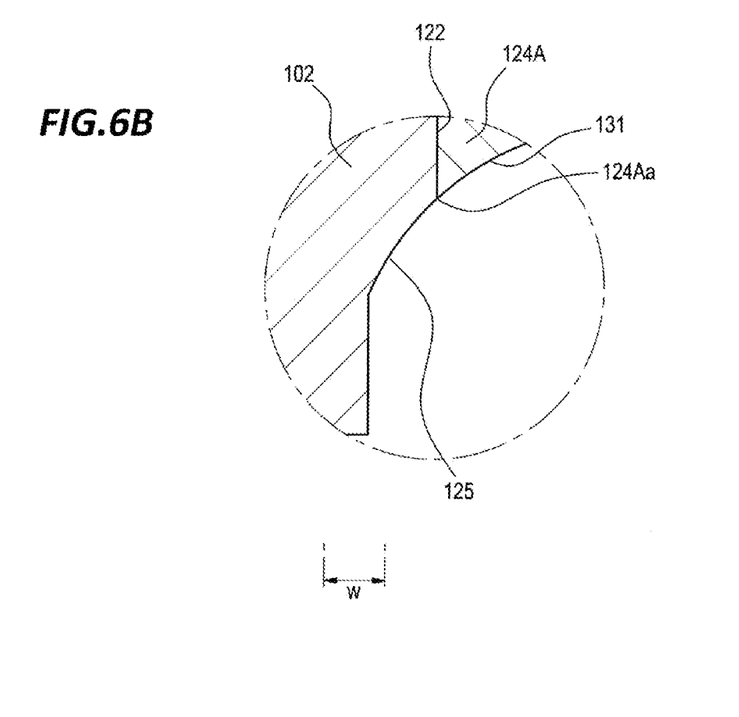
FIG. 6B is an enlarged view illustrating a part of FIG. 6A.

FIGS. 6A and 6B are views illustrating the shape of a tip end portion of the protruding pin according to the reference example, in which FIG. 6A is a sectional view taken along line B-B of FIG. 3 in the case of using a manufacturing apparatus according to the reference example, and FIG. 6B is an enlarged view illustrating a portion encircled by a one-dot chain line in FIG. 6A.

As illustrated in FIG. 6A and 6B, in the manufacturing apparatus according to the reference example, the movable mold 102 has a protruding pin 124A without the second surface 132. That is, only the first surface 131 is formed on the tip end face of the protruding pin 124A.

When the resin R is injected into the cavity 103, this protruding pin 124A is disposed such that an outer edge of the first surface 131 thereof is continuous to the inner surface 125 around the sliding hole 122 of the movable mold 102.

By the manufacturing apparatus according to the reference example, the optical component 30 having the first incident surface 71 without the step portion D is formed.

Since the first incident surface 71 is a convex curved surface, a tip end portion 124Aa of the tip end face of the protruding pin 124A for molding the first incident surface 71, which is located at the tip end on the outer circumferential-edge portion in the first direction X, has a sharp, pointed and thin shape as illustrated in the drawing. Such a pointed tip end portion 124Aa is low in strength, so that the tip end portion 124Aa may be bent by a force exerted when the optical component 30 is pierced by the protruding pin 124A. Further, when the protruding pin 124A returns to its original position, the bent tip end portion 124Aa may come into contact with the movable mold 102. Moreover, the tip end portion 124Aa of the protruding pin 124A, which is bent, may be compressed against an inner wall of the movable mold 102 by resin pressure when the resin is injected into the cavity 103. Thus, the tip end portion 124Aa of the protruding pin 124 may be broken. Consequently, the bent or broken protruding pin 124A causes a burr or a depression to be formed on the first incident surface 71, so that it is impossible to obtain a desired optical surface.

On the contrary, in the method and apparatus 100 for manufacturing the optical component 30 according to the exemplary embodiment, the angle θ2 of the second surface 132 relative to the first direction X is larger than the angle θ1 of the portion of the first surface 131 adjacent to the second surface 132 relative to the first direction X. Therefore, it is easy to form the tip end portion formed on the second surface 132 of the protruding pin 124 into a blunt shape, and the strength of the tip end portion may be increased. Accordingly, there is a low possibility that the tip end face formed on the second surface 132 is bent or broken, so that it is easy to obtain an optical surface of a desired shape.

Further, the angle θ2 of the second surface 132 relative to the first direction X is set to be 60 degrees or more, so that it is easy to form the tip end formed on the second surface 132 into a blunter shape, and also the strength may be increased.

Furthermore, in the manufacturing apparatus 100 according to the exemplary embodiment, the second surface 132 is a flat surface, thereby hardly affecting the optical performance of the formed optical surface, that is, the first incident surface 71.

Preferably, the width W between the outer circumferential edge 132a of the second surface 132 and the border 132b of the second surface 132 adjacent to the first surface 131 is set to be in a range of 0.1 mm to 0.5 mm. Such a configuration hardly affects the optical performance of the formed optical surface, namely, the first incident surface 71, and allows the tip end of the outer circumferential edge of the tip end face formed on the second surface 132 to have high strength.

Further, in the manufacturing apparatus 100 according to the exemplary embodiment, the first surface 131 has the shape of a concave surface corresponding to the first incident surface 71 that is a convex lens. Thus, the angle of the outer circumferential edge portion of the first surface 131 relative to the first direction X is likely to be small, and the outer circumferential edge portion of the tip end face of the protruding pin 124 is likely to be pointed. Therefore, as in the manufacturing apparatus 100 according to the exemplary embodiment, if the second surface 132 is provided on at least a part of the peripheral edge of the first surface 131, the outer circumferential edge portion that is likely to be pointed may be formed in the blunt shape by the second surface 132, and the damage to the outer circumferential edge portion of the tip end face of the protruding pin 124 may be suppressed.

Although an example where the second surface 132 is the flat surface has been described in the aforementioned exemplary embodiment, the second surface 132 may be a curved surface. In this case, the angle θ2 of the second surface 132 relative to the first direction X may take any angle, as long as an average angle of the whole area of the second surface 132 is larger than the angle θ1 of the first surface 131 relative to the first direction X.

Further, although an example, where the tip end face of the protruding pin 124 includes the first and second surfaces 131 and 132, has been described in the aforementioned exemplary embodiment, the present disclosure is not limited thereto. For example, in addition to the first and second surfaces 131 and 132, a third surface that is discontinuous from the first surface 131, and/or a fourth surface having a curvature different from that of the first surface 131 may be provided on the tip end face of the protruding pin 124.

Although an example where the present disclosure is applied to the optical component of the vehicle lamp for a DRL has been described in the aforementioned exemplary embodiment, the present disclosure is not limited thereto. The present disclosure may be applied to the optical component of the vehicle lamp for a combination lamp including at least two of a head lamp, a tail lamp, a turn signal lamp, and a stop lamp.

Further, although an example where the present disclosure is applied to the optical component 30 used in the vehicle lamp 10 has been described in the aforementioned exemplary embodiment, the present disclosure is not limited to the optical component 30 of the vehicle lamp 10, but may be applied to various optical components made of resin, such as an optical component used for a lighting apparatus, an optical component used for a camera, or an optical component used for a photoelectronic component such as an LED.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for manufacturing an optical component having an optical surface, the method comprising:
making a fixed mold and a movable mold come into contact with each other such that a cavity is formed, the movable mold having a protruding pin that reciprocates in a first direction and configured to reciprocate in the first direction;
injecting a molten resin into the cavity;
curing the molten resin in the cavity such that the optical component is formed; and
moving the movable mold away from the fixed mold in the first direction; and
moving the protruding pin relative to the movable mold in the first direction toward a cavity side such that a part of the optical surface of the optical component attached to the movable mold is pierced by a tip end face of the protruding pin, thereby taking the optical component out from the movable mold,
wherein the tip end face of the protruding pin comprises:
a first surface; and
a second surface having an area smaller than an area of the first surface and extending continuously from the first surface in a curved form, the second surface being located on at least a part of an outer circumferential edge portion of the tip end face of the protruding pin, and located at the tip end face of the protruding pin in the first direction,
wherein, among two angles formed at the cavity side between the second surface and a line intersecting the second surface in the first direction, an angle formed to be smaller than the other angle between the second surface and the line intersecting the second surface in the first direction is larger than, among two angles formed at the cavity side between the first surface and a line intersecting the first surface in the first direction, an angle formed to be smaller than the other angle between the first surface and the line intersecting the first surface in the first direction.

2. The method of claim 1, wherein the angle formed to be smaller than the other angle between the second surface and the line intersecting the second surface in the first direction at the cavity side is 60degrees or more.

3. The method of claim 2, further comprising:
providing the first surface that is a concave curved surface, and providing the second surface on at least a part of a peripheral edge of the first surface.

4. The method of claim 1, further comprising:
providing the first surface that is a concave curved surface, and
providing the second surface on at least a part of a peripheral edge of the first surface.

5. An apparatus for manufacturing an optical component, comprising:
a fixed mold; and
a movable mold defining a cavity in conjunction with the fixed mold, and reciprocating in a first direction, the movable mold having a protruding pin that reciprocates in the first direction,
wherein a tip end face of the protruding pin comprises:
a first surface; and
a second surface having an area smaller than an area of the first surface, and extending continuously from the first surface in a curved form, the second surface being located on at least a part of an outer circumferential edge portion of the tip end face, that is, a tip end in the first direction,
wherein an angle of the second surface relative to the first direction is larger than an angle of a portion of the first surface adjacent to the second surface relative to the first direction.

* * * * *